June 17, 1930.  K. E. LYMAN  1,763,854
BRAKE
Filed Sept. 19, 1927

INVENTOR
KENNETH E. LYMAN
BY
M. W. McConkey
ATTORNEY

Patented June 17, 1930

1,763,854

UNITED STATES PATENT OFFICE

KENNETH E. LYMAN, OF CHICAGO, ILLINOIS, ASSIGNOR TO BENDIX BRAKE COMPANY, OF CHICAGO, ILLINOIS, A CORPORATION OF ILLINOIS

BRAKE

Application filed September 19, 1927. Serial No. 220,315.

This invention relates to brakes and is illustrated as embodied in an internal expanding automobile brake. An object of the invention is to provide simple mechanism of the servo type for applying the brake, by utilizing a servo shoe or the like which applies the brake through a linkage or other connection when the drum is turning in one direction and which applies the brake by direct engagement with the friction means when the drum is turning in the other direction. The servo shoe may be forced against the drum by means such as a cam arranged to permit it to shift in either direction with the drum. In the arrangement shown in the drawing the friction means of the brake consists of a band, preferably varying in flexibility from its free end to its anchored end, and which is operated by direct engagement with the servo shoe when the drum is turning in one direction and through a linkage when the brake is turning in the other direction.

The above and other objects and features of the invention, including various novel and desirable details of construction, will be apparent from the following description of one illustrative embodiment shown in the accompanying drawing, in which.

Figure 1:
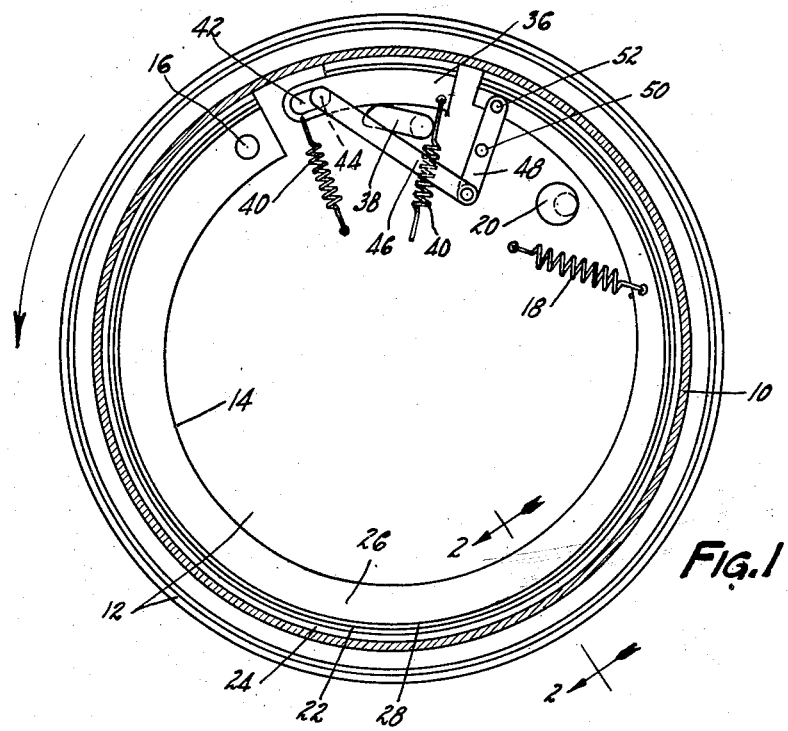
Figure 1 is a vertical section through the brake just inside the head of the brake drum and showing the friction means of the brake in side elevation.

In the arrangement selected for illustration the brake comprises a rotatable drum 10, at the open side of which is arranged a suitable support such as a backing plate 12, and within which is arranged the friction means of the brake. In the particular brake illustrated, the friction means comprises a band or shoe 14 anchored on a pivot 16 and urged away from the drum by a return spring 18 to an idle position determined by an adjustable eccentric stop 20. I prefer that the band or shoe 14 should be tapered to vary its flexibility, being most flexible at its free end and gradually decreasing in flexibility until it is almost rigid at its anchored end.

Figure 2:
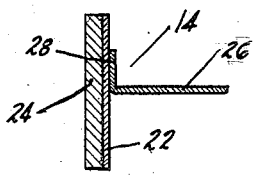
Figure 2 is a section through the friction means of the brake, on the line 2—2 of Figure 1.
Figure 3:
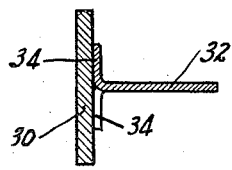
Figure 3 is a section corresponding to Figure 2 but showing a different manner of construction of the friction means.

One manner of construction of the band or shoe 14 is shown in Figure 2, in which there is an outer band or rim member 22 to which the brake lining 24 is riveted or otherwise secured, and which is partially stiffened by a web member 26 tapering in height and formed with a flange 28 underlying and welded or riveted to the inner face of the rim member 22. An alternative construction is shown in Figure 3, there being a strip or band 30 of metal lining of a material such as bronze or cast iron, which is partially reinforced by a web member 32 having tongues 34 alternately turned in opposite directions and welded or riveted or otherwise secured to the inner face of the lining 30.

According to an important feature of the present invention, the brake is applied through the medium of a floating servo shoe 36 urged by means such as a cam 38 toward the drum to apply the brake, against the resistance of suitable return springs 40. In the particular arrangement illustrated the drum is turning counter-clockwise and the shoe 36 has applied the brake by engagement of the end of a slot 42 with a pin 44 projecting into the slot and carried by a tension link 46 pivotally connected to a lever 48 fulcrumed on the backing plate 12 at 50 and pivotally connected at 52 to the free end of the band or shoe 14.

If, however, the drum were turning clockwise instead of counter-clockwise, the shoe 36 will apply the brake by directly engaging the free end of the band or shoe 14, the slot 42 being long enough so that its left end would not in this case engage the pin 44.

While one illustrative embodiment of the invention has been described in detail, it is not my intention to limit its scope to that particular embodiment or otherwise than by the terms of the appended claims.

I claim:

1. A brake comprising, in combination, a rotatable drum, friction means engageable with the drum, a servo member engageable with the drum and operable to apply the friction means by direct engagement therewith when the drum is turning in one direction, and connections operated by the servo member for applying the friction means when the drum is turning in the other direction.

2. A brake comprising, in combination, a rotatable drum, friction means within the drum, a servo member engageable with the drum and arranged to operate the friction means by direct engagement therewith when the drum is turning in one direction, and connections from the servo member operated when the drum is turning in the other direction to apply the friction means.

3. A brake comprising, in combination, a rotatable drum, friction means within the drum arranged to leave a gap at one side of the drum, a servo member within said gap and engageable with the same zone of the drum as the friction means and which is arranged to operate the friction means by direct engagement therewith when the drum is turning in one direction, and power-transmitting means through which the friction means is applied by the servo member when the drum is turning in the other direction.

4. A brake comprising, in combination, a rotatable drum, friction means within the drum arranged to leave a gap at one side of the drum, a servo member within said gap and engageable with the same zone of the drum as the friction means and which is arranged to operate the friction means by direct engagement therewith when the drum is turning in one direction, and a linkage through which the friction means is applied by the servo member when the drum is turning in the other direction.

5. A brake comprising, in combination, a rotatable drum, a tapered friction member within the drum anchored at its less flexible end and which gradually decreases in flexibility from its free end to its anchored end, the free end and the anchored end being spaced apart to leave a gap at one side of the drum, and a servo member arranged in said gap and which acts on said free end to apply the brake.

6. A brake comprising, in combination, a rotatable drum, a tapered friction member within the drum anchored at its less flexible end and which gradually decreases in flexibility from its free end to its anchored end, the free end and the anchored end being spaced apart to leave a gap at one side of the drum, and a servo member arranged in said gap and which acts on said free end in either direction of rotation of the drum to apply the brake.

7. A brake comprising, in combination, a rotatable drum, a friction member within the drum which is anchored at the same end in either direction of drum rotation and which extends around the greater part of the circumference of the drum but in such a manner as to leave a gap between its free end and its anchored end at one side of the drum, and a servo member arranged in said gap and engagable with the same zone of the drum as the friction member and which is arranged to force the friction member against the drum to apply the brake.

8. A brake comprising, in combination, a rotatable drum, a friction member within the drum which is anchored at the same end in either direction of drum rotation and which extends around the greater part of the circumference of the drum but in such a manner as to leave a gap between its free end and its anchored end at one side of the drum, and a servo member arranged in said gap and engageable with the same zone of the drum as the friction member and which is arranged to force the friction member against the drum to apply the brake in either direction of rotation of the drum.

9. A brake comprising, in combination, friction means, a servo member arranged when moved in one direction to operate the friction means by direct engagement therewith, a lever connected to the friction means, and a connection from the lever to the servo member arranged to operate the friction means when the servo member moves in the opposite direction.

10. A brake comprising, in combination, a rotatable drum, a tapered friction member within the drum anchored at its less flexible end and which gradually decreases in flexibility from its free end to its anchored end, and a servo member arranged within said drum acting on said free end to apply the brake.

11. A brake comprising, in combination, a rotatable drum, a friction member varied in flexibility throughout its length and a servo member arranged to act on the most flexible end of the friction member.

12. A brake comprising, in combination, a variably flexible tapered friction member and a servo applying member constructed and arranged to actuate said friction member.

13. A brake comprising, in combination, a variably flexible tapered friction member and a servo applying member constructed and arranged to actuate said friction member contacting the end of said friction member of least width.

In testimony whereof, I have hereunto signed my name.

KENNETH E. LYMAN.